United States Patent [19]

Shirai

[11] Patent Number: 4,829,651

[45] Date of Patent: May 16, 1989

[54] METHOD OF AND APPARATUS FOR MANUFACTURING AND VERTICALLY STACKING PANELS FOR TWO-BY-FOUR WOOD CONSTRUCTION RESIDENCE

[76] Inventor: Hideaki Shirai, no. 4919-88 Tukahara, Minamiashigara-Shi, Kanagawa-ken, 250-01, Japan

[21] Appl. No.: 168,457

[22] Filed: Mar. 15, 1988

[30] Foreign Application Priority Data

Aug. 19, 1987 [JP] Japan ............................... 62-207149

[51] Int. Cl.[4] ...................... B21D 39/03; B23P 11/00; B23P 19/00

[52] U.S. Cl. ...................................... 29/430; 29/432; 29/795; 29/798; 29/281.1; 227/41; 227/103; 227/104; 414/769

[58] Field of Search ................. 29/429, 430, 432, 798, 29/33 K, 281.1, 784, 795; 227/39, 41, 103, 105, 104; 414/769

[56] References Cited

U.S. PATENT DOCUMENTS

| | | | |
|---|---|---|---|
| 3,399,445 | 9/1968 | Carroll | 29/430 X |
| 3,413,703 | 12/1968 | Sanford | 29/432 X |
| 3,443,303 | 5/1969 | Groat | 29/432 X |
| 3,601,882 | 8/1971 | McRae | 29/430 |
| 3,685,129 | 8/1972 | Jureit et al. | 29/432 |
| 3,699,628 | 10/1972 | Gollobity | 29/430 X |
| 3,851,384 | 12/1974 | Kellner | 29/430 |
| 3,897,620 | 8/1975 | Wright | 29/430 |
| 4,175,313 | 11/1979 | Neumann | 29/430 |
| 4,330,921 | 5/1982 | White, Jr. | 29/432 |

*Primary Examiner*—Charlie T. Moon
*Attorney, Agent, or Firm*—Sandler & Greenblum

[57] ABSTRACT

A method of and apparatus for manufacturing panels for forming walls, roofs, or floors of a timber-framed residence constructed by a two-by-four construction method and of setting these panels on a pallet. A panel formed on a frame manufacturing table is supported and floated over the table by free-roller conveyors. The panel is thereafter slid by being light pushed over the free-roller conveyors of the frame manufacturing table and over free-roller conveyors which are disposed on a fixture work and which are also moved upward to the same level as that of the conveyors of the frame manufacturing table, thereby transferring the panel to the frame manufacturing table to the fixture work table. The panel finished by fixture work on the fixture work table is supported by free-roller conveyors which are perpendicular to the transferring free-roller conveyors, thereby floating the panel over the table. Then, it can be easily moved through a predetermined distance to a waiting place for the pallet while being supported by a risable support frame. This support frame on which the completed panel is supported can be inclined at this laterally shifted position so that one side of the support frame nearer to the waiting place becomes lower than the other, thereby enabling the panel to stand easily.

2 Claims, 5 Drawing Sheets

METHOD OF AND APPARATUS FOR MANUFACTURING AND VERTICALLY STACKING PANELS FOR TWO-BY-FOUR WOOD CONSTRUCTION RESIDENCE

BACKGROUND OF THE INVENTION

This invention relates to a method of manufacturing panels for forming the walls, roofs and floors of a timber-framed residence constructed by a two-by-four construction method and of setting those panels on a pallet, and to an apparatus for carrying out this method. This method enables such types of panels to be easily manufactured with high efficiency and enables completed panels to be successively set on pallets and thereafter stored or transported to a building site.

In a known process of assembling this type of building member, the operation of forming frames, application of plywood and fixture work related to the forming of doorways or windows are successively performed while the parts are being moved in one direction over a long straight horizontal working table, and the completed panels are let down from the tail end of the horizontal table and then temporarily stacked flat.

The completed panels are moved in the horizontally stacked state to a separate place for storage or are transported directly to the building site.

The panel-manufacturing working table used in the conventional two-by-four construction method is very long and the length of each panel may reach several tens of meters. The space needed to accommodate this table is therefore very large.

Since the size and weight of each panel are considerable, several workers are employed to move a panel to the position at which the next operation will be performed. Also, several workers are needed to let down a completed panel from the working table or to set up pallets which have been stacked flat for storage and transportation. This involves a considerable amount of labor which slows down the work. There is also a problem of the potential danger connected with this work. These are significant factors leading to increased labor cost.

SUMMARY OF THE INVENTION

An object of the present invention is to provide a method which does not involve the above-described problems in the process of manufacturing panels or in tasks connected with the storage or transportation of the panels.

Another object of the present invention is to provide a system which enables the operations of manufacturing panels and setting the panels on a pallet for transportation or storage to be performed consistently and successively in a small space by small number of workers.

The present invention provides in one of its aspects a method of manufacturing and vertically stacking panels for a two-by-four wood construction residence, including the steps of:

manufacturing a panel used to form walls, roofs or floors by assembling a horizontally disposed frame on a frame manufacturing table and applying a plywood plate to the frame;

horizontally moving the panel over a first free-roller conveyor disposed on the frame manufacturing table so that the panel is transferred to a second free-roller conveyor disposed on a fixture work table;

placing the panel on the fixture work table by moving downward the second free-roller conveyor, thereafter performing fixture work for forming a window, door, or the like;

moving upward a third free-roller conveyor so as to float the panel over the fixture work table, the third conveyor being adapted to carry the panel out of the fixture work table and facing in the direction perpendicular in a horizontal plane to the first and second free-roller conveyors;

horizontally moving the panel over the third free-roller conveyor in the direction perpendicular to the direction of the transference while supporting the panel by a supporting frame so that one side of the panel projects from one end of the fixture work table through a distance approximately equal to the height of the fixture work table;

inclining the support frame so as to move downward the projecting side of the panel so that the completed panel on the support frame is made to stand; and receiving the panel by a vertical-setting pallet disposed in a waiting state by the side of the fixture work table so that the panel is set on the vertical-setting pallet.

The present invention provides in another of its aspects an apparatus for manufacturing and vertically stacking panels for a two-by-four wood construction residence, having:

a frame manufacturing table on which framing and application of plywood are performed;

a fixture work table on which fixture work for forming a window, a door, or the like, the fixture work table adapted to stands a completed panel, the fixture work table being disposed by the side of the fixture work table, the fixture work table and the frame manufacturing table being flush with each other;

a waiting place in which a pallet on which panels are set vertically is provided by the side of the fixture work table;

first free-roller conveyors mounted on the frame manufacturing table while being arranged in one direction and adapted to transfer the panel, the first conveyors being flush with panel receiving surfaces of the tables when the panel is manufactured and when the fixture work is performed, the first conveyors being moved upward so as to support and float the panel over the tables when the panel is transferred in the horizontal direction from the frame manufacturing table to the fixture work table;

a lever with a pedal for moving the first free-roller conveyors upward and downward;

a second free-roller conveyor for carrying the panel out of the fixture work table, the second conveyor sinking below the panel receiving surface of the fixture work table when the fixture work is performed, the second conveyor being moved upward so as to support the panel with a support frame interposed therebetween and thereby float the panel over the fixture work table when the completed panel is made to stand, the second conveyor being mounted on the fixture work table, the second conveyor being perpendicular to the first conveyor;

a lever with a pedal for moving the second free-roller conveyor upward and downward;

a pair of members disposed on a central portion of the panel support frame and on an end portion of the fixture work table, the pair of members engaging with each other so as to function as a stopper and provide a turning center axis of the panel support frame when the panel support frame on the second free-roller conveyor is moved to the side of the waiting place through a distance approximately equal to the height of the fixture work table; and a panel positioning stopper provided at the end of the panel support frame nearer to the waiting place.

The operation in accordance with the present invention is as follows.

A panel manufactured on the frame manufacturing table is supported by the free-roller conveyor so that it floats over the table. At the same time, the panel can slide over the free-roller conveyors by being lightly pushed so that it moves from the frame manufacturing table to the fixture work table, since the free-roller conveyor provided on the fixture work table for transferring the panel have also been moved upward to the same level as that of the free-roller conveyors of the frame manufacturing table.

The panel finished by the fixture work on the fixture work table is supported by free-roller conveyors which are perpendicular to the transferring free-roller conveyors, thereby floating the panel over the table. Then, it can be easily moved through a predetermined distance to the waiting place for the pallet while being supported by the risable support frame. The support frame on which the completed panel is supported can be easily inclined at this laterally shifted position to stand the panel, thereby enabling the panel to be directly set in a standing state on the vertical-setting panel.

BRIEF DESCRIPTION OF THE DRAWINGS

The accompanying drawings show an apparatus for manufacturing and vertically stacking panels for a two-by-four wood construction residence, which is an embodiment of the present invention.

DESCRIPTION OF THE PREFERRED EMBODIMENTS

Figure 1:
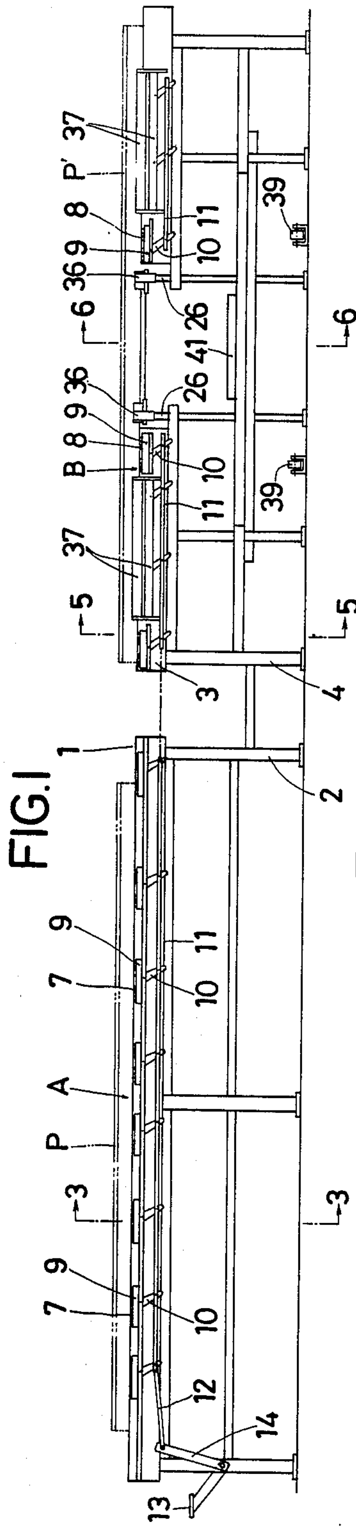
FIG. 1 is a front view of an apparatus for manufacturing and vertically stacking panels.
Figure 2:
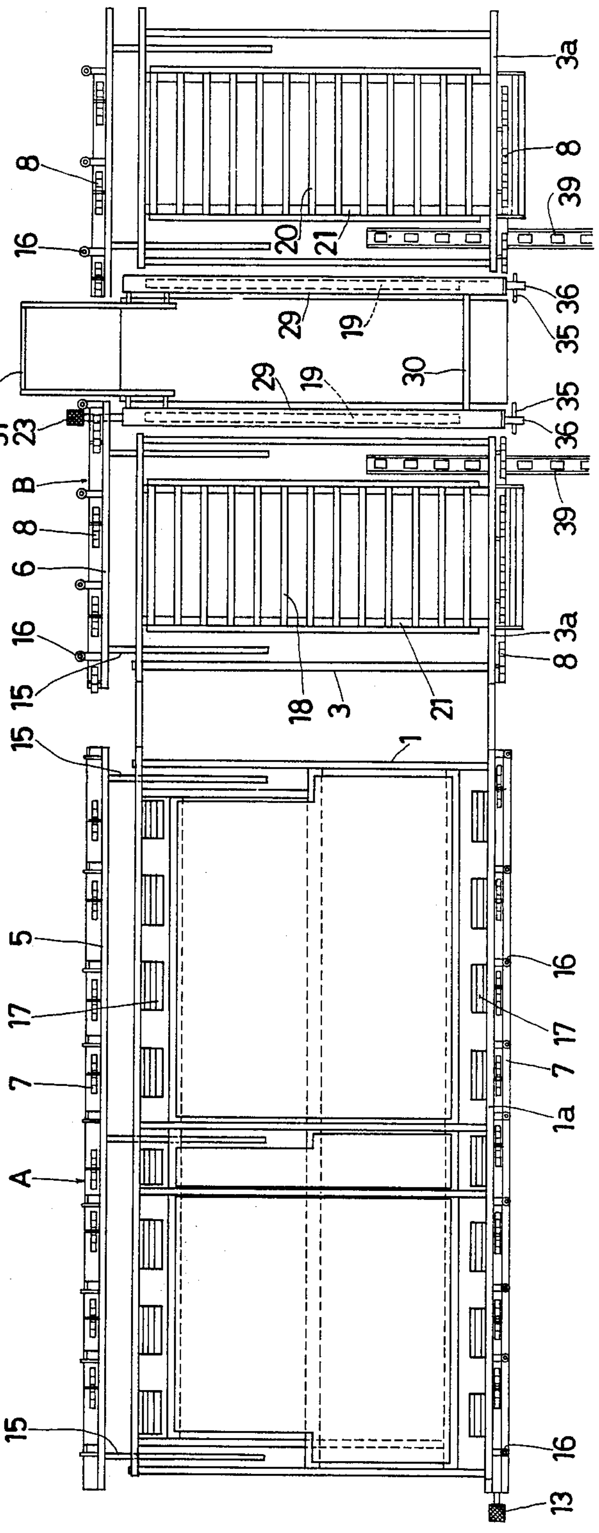
FIG. 2 is a plan view of the apparatus shown in FIG. 1.
Figure 3:
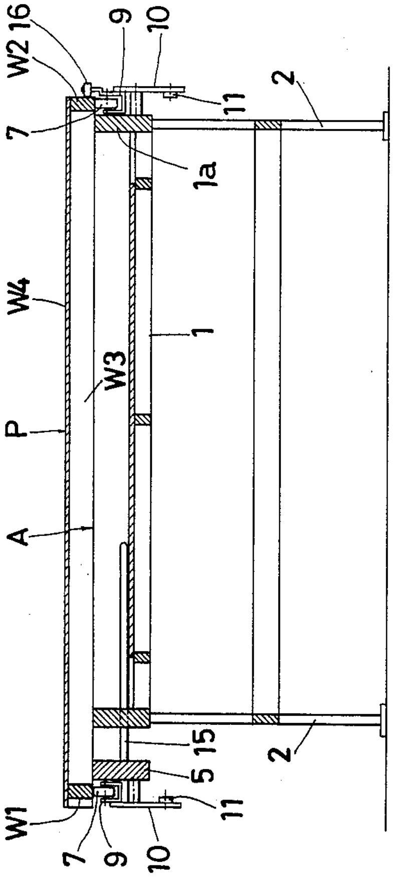
FIG. 3 is an enlarged cross-sectional view take along the line 3—3 of FIG. 1.

Referring to FIGS. 1 to 3, a frame manufacturing table A has a main frame 1 which is rectangular in plan, and legs 2 disposed under the main frame 1, while a fixture work table B has a main frame 3 and legs 4 disposed under the main frame 3. The main frame 3 is generally rectangular in plan but has at its center a discontinuity which has a constant width and extends in the direction perpendicular to the longitudinal axis of the main frame 3. The frame manufacturing table A and the fixture work table B are fixedly installed on the ground with their longitudinal axes aligned with each other.

Movable beams 5 and 6 are disposed along one side of the main frame 1 of the frame manufacturing table A and the corresponding side of the main frame 3 of the fixture work table B, whereby the widths of the main frames can be changed in accordance with the design width of a given panel. Rods which have the function of guiding the movable beams 5 and 6 as well as of supporting these beams are provided.

Pairs of free-roller conveyors 7 and 8 which are capable of moving upward or downward and which extend in the longitudinal direction of the tables are provided on the outside surfaces of the movable beams 5 and 6 and on the outside surfaces of side members 1*a* and 3*a* opposite to the movable beams 5 and 6.

The conveyors 7 and 8 are constructed as follows. A plurality of groups of several rollers are provided, each group of rollers being disposed in alignment with each other and axially supported by a bearing member 9. These groups of rollers and bearing members 9 are attached to upper free ends of swingable links 10 which are axially supported on the side members 1*a* and 3*a* of the main frames 1 and 3 on the outside thereof. Lower free ends of the swingable links 10 are attached in common to rods 11, and one end of each rod 11 is connected to a lever 14 having a pedal 13. That is, a parallel link mechanism is formed by the swingable links 10 attached to the bearing members 9 and by the common rod 11.

If, in the state illustrated in FIG. 1, the pedal 13 of the frame manufacturing table A is depressed, the common rods 11 are pulled to the left, the swingable links 10 are simultaneously turned clockwise and are raised so that they become generally vertical, and the rollers, that is, the free-roller conveyors 7, are moved upward so that the rollers partially protrude beyond the upper surface of the main frame 1.

The free-roller conveyors 8 of the fixture work table B operate in the same manner as the free-roller conveyors 7 of the frame manufacturing table A, and the lever 14 with the pedal 13 provided for the frame manufacturing table A also serves to operate the free-roller conveyors 8 of the fixture work table B. Alternatively, a lever with a pedal for the table B alone may be provided.

Rollers 16 for positioning the edges of panels are disposed at regular intervals along the outer side of at least one of the pair of conveyors 7 of the frame manufacturing table A and along the outer side of at least one of the pairs of conveyors 8 of the fixture work table B.

Scale members 17 capable of rising and sinking and adapted to determine the positions of panel's studs are attached to the inner surfaces of the pair of longitudinal side members of the main frame 1 of the frame manufacturing table A.

The operation of manufacturing a panel is started from the state in which, as shown in FIG. 1, the upper surfaces of the free-roller conveyors 7 and 8 of the frame manufacturing table A and the fixture work table B are set at the same level as the upper surfaces of the main frames 1 and 3. Free-roller conveyors 18, 19, and 20 for carrying the panel out of the fixture work table, which will be described later, are disposed on this table in such a manner that they face in the direction perpendicular to the longitudinal direction of the table, in which direction the free-roller conveyors 8 extend, and that the upper surfaces of the conveyors 18 and 19 are slightly lower than the upper surface of the main frame 3.

As shown in FIG. 3, frame members W1 and W2 which respectively form upper and lower frame portions of a panel are placed on the free-roller conveyors 7 of the frame manufacturing table A, and the upper and lower frame members W1 and W2 and stud members W3 are nailed to each other.

A plywood plate W4 is placed on a frame which comprises an assembly of the upper and lower frame members W1 and W2 and the stud members W3 and is nailed and fixed thereto with nails, thereby forming a panel P.

Figure 4:
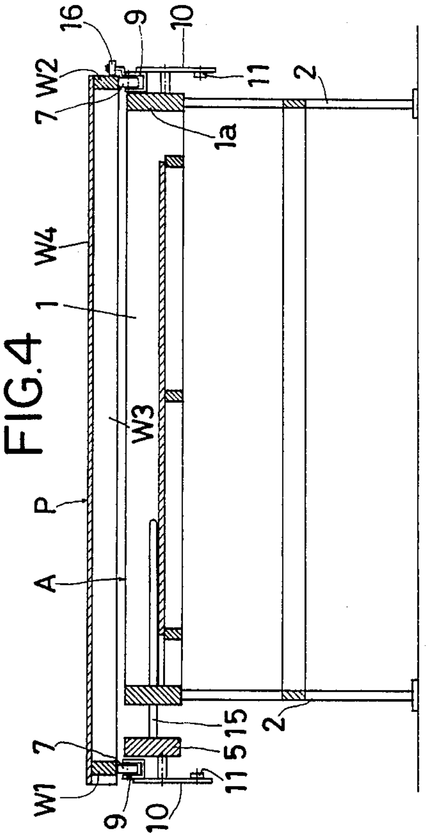
FIG. 4 is a cross-sectional view corresponding to FIG. 3, illustrating a state in which the panel is floated over the main frame.

The free-roller conveyors 7 and 8 of the two working tables are moved upward by depressing the pedal 13, and, in the state shown in FIG. 4, the panel P is pushed in the direction of the fixture work table B so that it slides over the conveyors 7 and 8 and moves to the fixture work table B.

Figure 5:
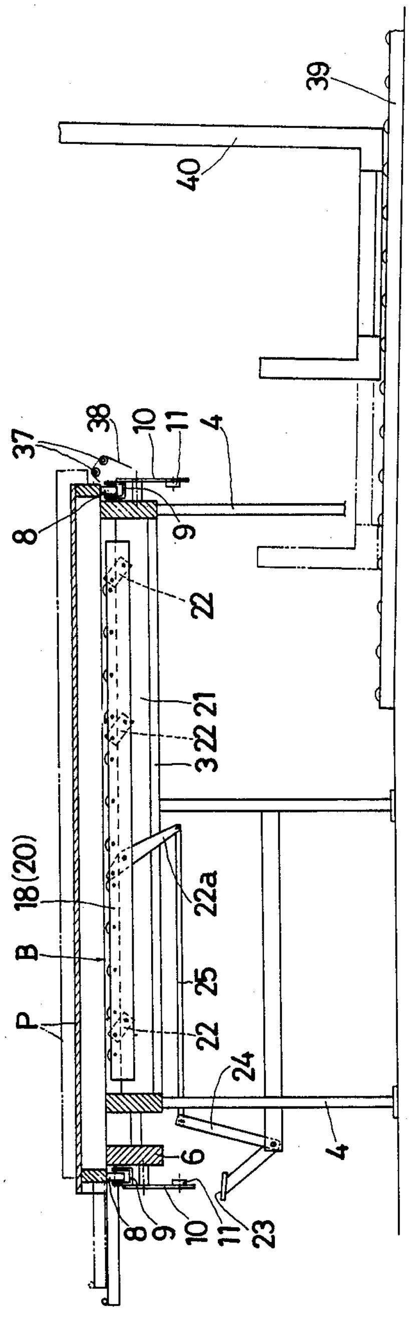
FIG. 5 is an enlarged longitudinal sectional view taken along the line 5—5 of FIG. 1.

After the panel P has been positioned correctly on the fixture work table B, as indicated on the right-hand side of FIG. 1, the pedal 13 is allowed to return and the free-roller conveyors 7 and 8 are moved downward to the same level as that of the main frames 1 and 3 so that the panel P is supported on the main frame 3 (refer to FIG. 5).

On the fixture work table B, the panel P undergoes fixture work for an opening such as a window or doorway, waterproofing, and so forth.

As mentioned above, the free-roller conveyors 18, 19, and 20 for carrying the panel out of the fixture work table B are disposed on this table in addition to the free-roller transfer conveyors 8 in such a manner that, as shown in FIG. 2, they are arranged in three rows in the direction perpendicular to the longitudinal direction of the conveyors 8.

Of these three rows of conveyors 18, 19, and 20, the left and right conveyors 18 and 20 are in the form of ladders and are constructed in such a manner that, as shown in FIG. 5, they are attached to sides of inner beams 21 of the main frame 3 by a plurality of small parallel links 22. A lever **22*a* which serves as one of the links 22 is connected by a rod 25 to a lever 24 having a pedal 23 and axially supported on one of the legs 4**.

The central conveyor 19 is disposed at the position of the discontinuity of the main frame 3, as shown in FIG. 2, and is constituted by a pair of rows of rollers spaced part from each other and disposed at left and right sides of the conveyor 19.

Figure 6:
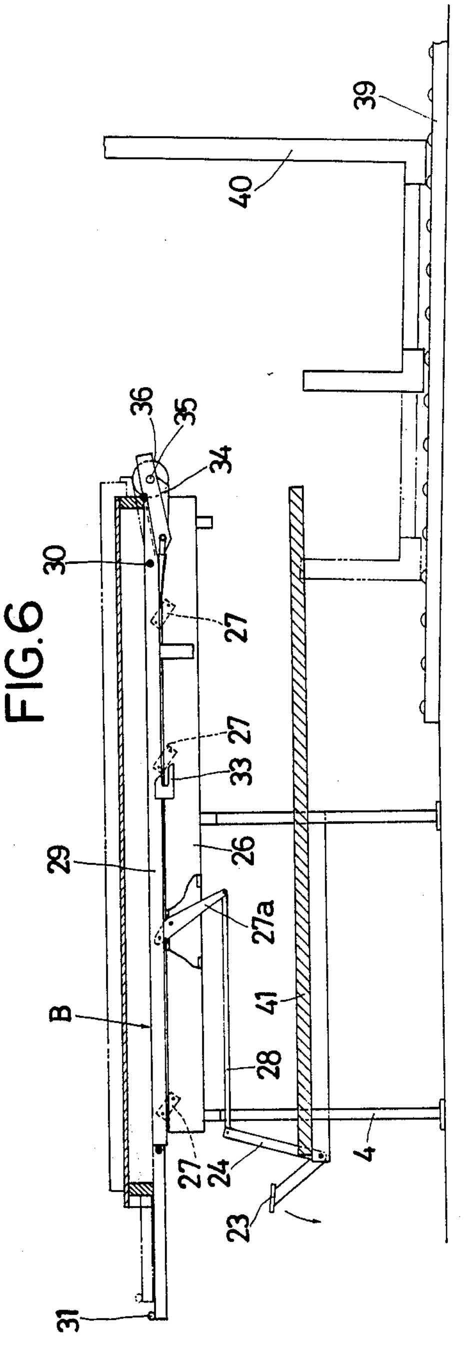
FIG. 6 is an enlarged longitudinal sectional view taken along the line 6—6 of FIG. 1.
Figure 8:
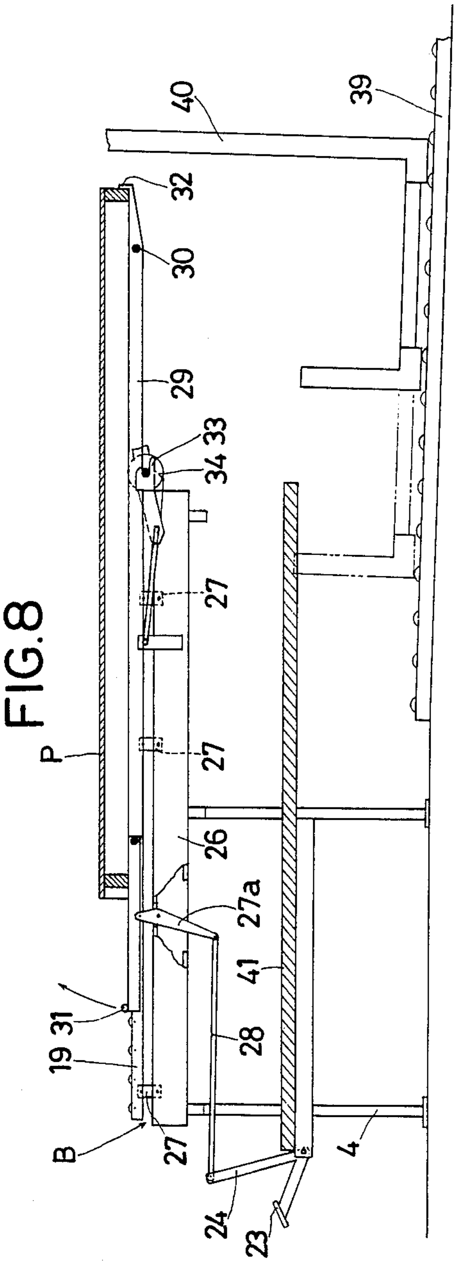
FIG. 8 is longitudinal sectional view long the line 6—6 of FIG. 1, corresponding to FIG. 7.

As shown in FIG. 6 and 8, rollers of the central free-roller conveyor 19 are attached to inner beams of the main frame 3 by a plurality of small links 27. A lever **27*a* which serves as one of the links 27 is also connected to the lever 24 with the pedal 23 by a rod 28**.

Panel support frame members 29 are slidably placed on the pair of rows of free rollers of the conveyor 19 and are integrally connected to each other at their front and rear ends by lateral rods 30 and 31.

After the work on the fixture work table B has been completed, the pedal 23 is depressed, and the lever **27*a* and the links 27 rise from the state shown in FIG. 6 to the positions indicated in FIG. 8 by the action of the parallel link mechanism moved by the lever 24 and the rod 25, so that the free-roller conveyors 18, 19 and 20 for taking out the panel are moved upward so as to float the panel P over the main frame 3**.

Figure 7:
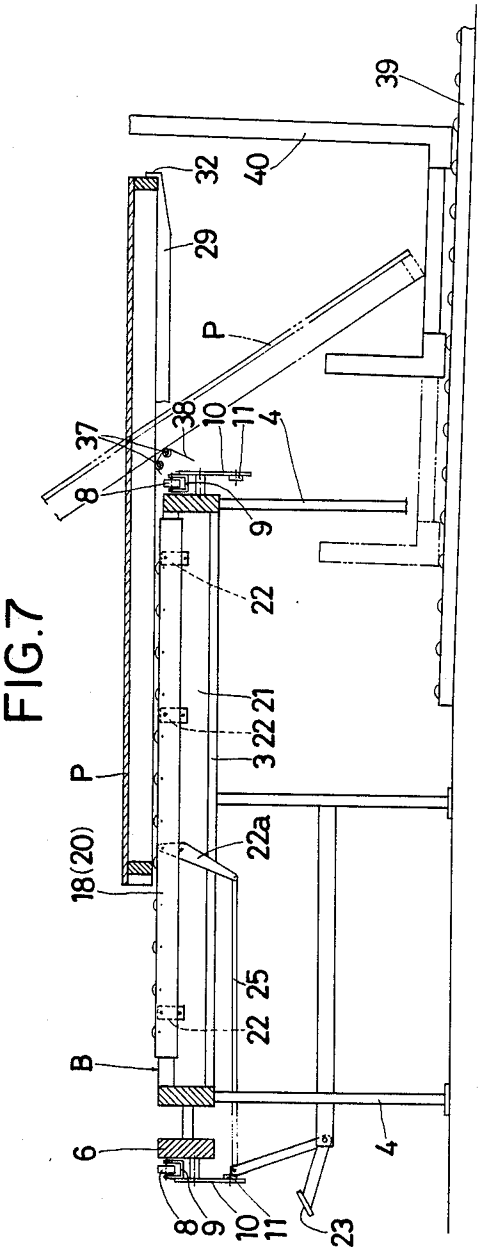
FIG. 7 is an enlarged longitudinal sectional view along the line 5—5 of FIG. 1, illustrating a state in which the panel is moved to the taking-out side while being floated.

The panel P is supported on the free-roller conveyors 18, 19, and 20 (with support frame members 29 interposed between the panel and the central conveyor 19). In this state, the panel P is moved together with the support frame 29 to the taking-out side (horizontally and perpendicular relative to the direction in which the panel is move from the frame manufacturing table A to the fixture working table B), as shown in FIGS. 7 and 8.

At this time, the lateral rods 31, that connect the support frame members 29 at the ends thereof opposite to the direction of the movement thereof, may be used as a handle so that the support frame is moved by gripping and pushing this handle.

A panel receiving stopper 32 is formed at the top of each support frame member 29 facing in the direction of the movement thereof, thereby supporting the edge of the panel P at the taking-out side.

A forked member 33 opened in the taking-out direction is attached to the side of each support frame member 29 at the center thereof. The position of the forked member 33 is determined such that, when the panel P or the taking-out side end of the support frame 29 projects from the end of the main frame 3 through a distance approximately equal to the height of the working table B, the forked member 33 engages with a lateral shaft 35 which is supported by an end bracket 34 on each of the beams 26. A guide roller 36 for receiving the lower surface of the panel P is provided on each lateral shaft 35.

Two pairs of upper and lower rollers 37 which have a function similar to that of the guide rollers 36 are mounted on the main frame 3 by brackets 38 at the taking-out side of the free-roller conveyors 18 and 20 in the form of ladders.

Free-roller conveyors 39 are disposed on the ground at the taking-out side of the fixture working table B along the taking-out direction thereof.

An opened vertical-setting pallet 40 is placed in a waiting state on the free-roller conveyors 39.

After the panel P supporting frame 29 have moved to the taking-out side and stopped by bringing the forked members 33 in engagement with the lateral shafts 35 (FIGS. 7 and 8), the operator steps on a step board 41 disposed under the central free-roller conveyor 19, and turns and raises the support frame 29 about the lateral shafts 35 in the direction indicated by the arrow in FIG. 8.

This operation is performed with the aid of expanding actions of gas springs 42 disposed between the beam 26 and the support frame 29, thereby enabling the heavy panel to be raised by only one worker.

Figure 9:
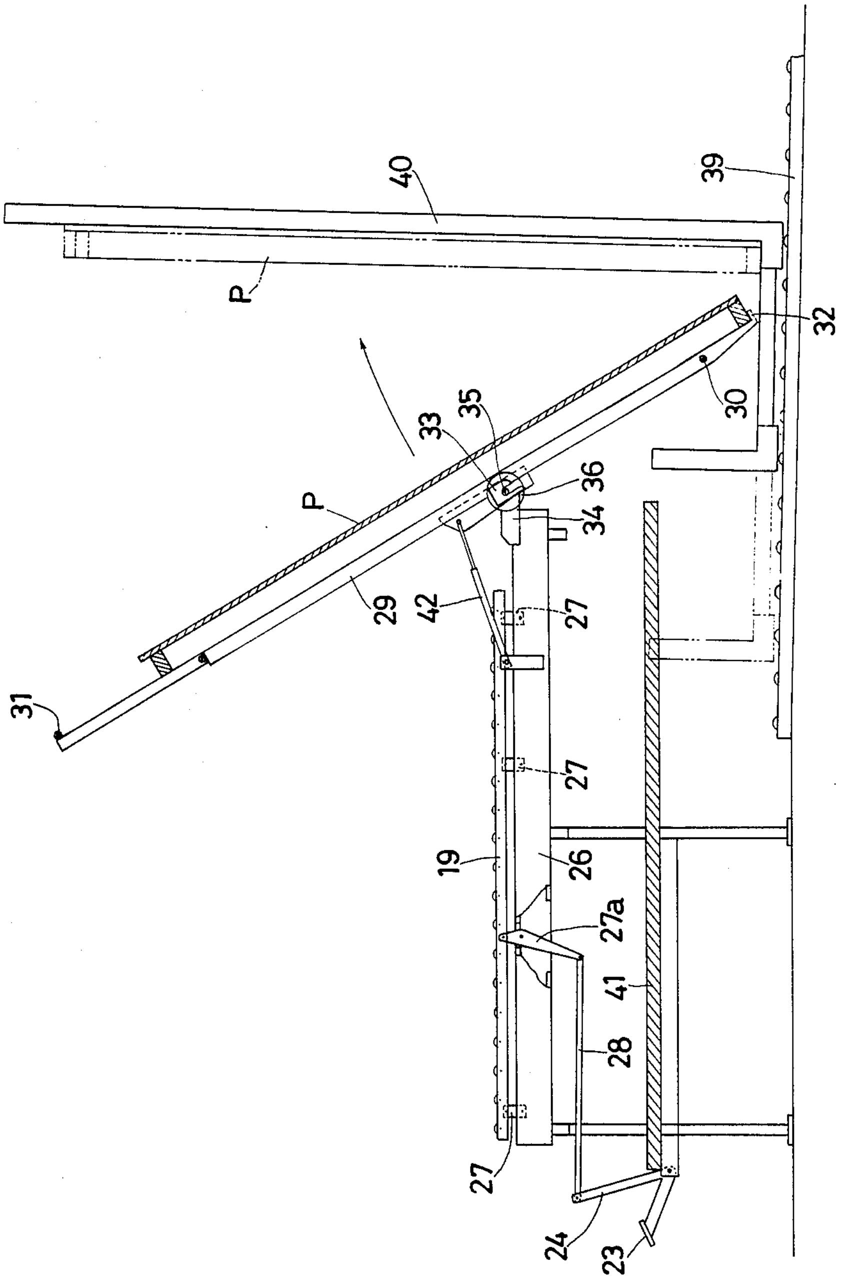
FIG. 9 is an enlarged longitudinal sectional view illustrating a state in which the panel supporting frame is raised from the position indicated in FIG. 8.

As shown in FIG. 9, when the end of the panel P supporting frame 29 is brought into contact with the bottom of the pallet 40, the panel P is pushed in the arrowed direction, is let down from the support frame 29, and is made to stand on the pallet as indicated by the dot-dashed chain line.

The panels P completed are successively set in the vertical setting pallet 40 by making them stand therein, as described above. After the pallet is fully packed with the panels, it is closed, is moved over the free-roller conveyors 39. It is thereafter transferred to a storehouse by a forklift or crane car or is transported to a building site by being loaded on a truck.

The support frame 29 from which the panel P has been unloaded is turned until it is laid on the free-roller conveyor 19. The operator thereafter pulls back the support frame 29 and returns the pedal 23 so as to move down the taking-out free-roller conveyors 18, 19, and 20 and the support frame 29 below the level of the upper surface of the main frame 3, thereby preparing for the next operation.

As described above, the method and the apparatus for manufacturing and vertically stacking panels for a two-by-four wood construction residence in accordance with the present invention does not need any machine power in moving panels in the horizontal direction on the working table and making them stand when they are set on the pallet, enabling the panels to move and stand by small human power. For these operations, it is sufficient to employ only two workers including an assistant, and the operations can be repeated in a short time.

Since completed panels are directly set in the vertical-setting pallet by being carried and moved in the direction perpendicular to the direction of transference from the frame manufacturing table to the fixture work table, the area in which the apparatus is installed is smaller than that needed for the conventional apparatus, and the distance through which the worker must move is small. Therefore, both the installation cost and the labor cost can be reduced, enabling a reduction in the total production cost of panels for a two-by-four wood construction residence.

What is claimed is:

1. A method of manufacturing and vertically stacking panels for a two-by-four wood construction residence, comprising the steps of:

manufacturing a panel used to form walls, roofs or floors by assembling a horizontally disposed frame on a frame manufacturing table and applying a plywood plate to the frame;

horizontally moving the panel over a first free-roller conveyor disposed on said frame manufacturing table so that the panel is transferred to a second free-roller conveyor disposed on a fixture work table;

placing the panel on said fixture work table by moving said second free-roller conveyor downwardly, thereafter performing fixture work for forming a window, door, or the like;

moving a third free-roller conveyor upwardly so as to float the panel over said fixture work table, said third conveyor being adapted to carry the panel out of said fixture work table and facing in a direction perpendicular, along a horizontal plane, to said first and second free-roller conveyors;

horizontally moving the panel over said third free-roller conveyor in the direction perpendicular to the direction of transfer of said panel while supporting the panel with a supporting frame so that one side of the panel projects from one end of said fixture work table over a distance which is approximately equal to the height of said fixture work table;

inclining said support frame so as to move said projecting side of the panel downwardly so that the completed panel on said support frame is made to stand; and using a vertical-setting pallet disposed in a waiting state by the side of said fixture work table receive the panel on the vertical-setting pallet.

2. An apparatus for manufacturing and vertically stacking panels for a two-by-four wood construction residence, comprising:

a frame manufacturing table on which framing and application of plywood are performed;

a fixture work table on which fixture work for forming a window, a door, or the like is adapted to be performed, said fixture work table being adapted to stand a completed panel, said fixture work table being disposed by a side of said fixture work table, said fixture work table and said frame manufacturing table being flush with each other;

a waiting area in which a pallet on which panels are set vertically is provided by the side of said fixture work table;

first free-roller conveyors mounted on said frame manufacturing table while being arranged in one direction and adapted to transfer the panel, said first conveyors being flush with panel receiving surfaces of said tables when the panel is manufactured and when the fixture work is performed, said first conveyors being moved upwardly so as to support and float the panel over said tables when the panel is transferred in the horizontal direction from said frame manufacturing table to said fixture work table;

a lever with a pedal for moving said first free-roller conveyors upwardly and downwardly;

a second free-roller conveyor for carrying the panel out of said fixture work table, said second conveyor sinking below said panel receiving surface of said fixture work table when the fixture work is performed, said second conveyor being moved upwardly so as to support the panel with a support frame interposed between said second conveyor and said panel to thereby float the panel over said fixture work table when the completed panel is made to stand, said second conveyor being mounted on said fixture work table, said second conveyor being perpendicular to said first conveyor;

a lever with a pedal for moving said second free-roller conveyor upwardly and downwardly;

a pair of members disposed on a central portion of said panel support frame and on an end portion of said fixture work table, said pair of members engaging each other so as to function as a stop and provide a turning center axis of said panel support frame when said panel support frame on said second free-roller conveyor is moved to the side of said waiting area over a distance approximately equal to the height of said fixture work table; and a panel positioning stop provided at an end of said panel support frame adjacent to said waiting place.

* * * * *

UNITED STATES PATENT AND TRADEMARK OFFICE
CERTIFICATE OF CORRECTION

PATENT NO. : 4,829,651

DATED : May 16, 1989

INVENTOR(S) : H. SHIRAI

It is certified that error appears in the above-identified patent and that said Letters Patent is hereby corrected as shown below:

Abstract, line 7, change "light" to ---lightly---.
Column 1, line 57, insert ---a--- after "by".
Column 2, line 36, change "stands" to ---stand---.
Column 3, line 18, change "conveyor" to ---conveyors---

Column 3, line 23, change "conveyor" to ---conveyors---.

Signed and Sealed this

First Day of January, 1991

*Attest:*

HARRY F. MANBECK, JR.

*Attesting Officer*

*Commissioner of Patents and Trademarks*